United States Patent [19]

Corcelle

[11] Patent Number: 4,465,915
[45] Date of Patent: Aug. 14, 1984

[54] METHOD AND APPARATUS FOR THREADING AN ELECTRODE WIRE THROUGH AN APERTURE IN A WORKPIECE

[75] Inventor: Francois Corcelle, Pouilly, France

[73] Assignee: Ateliers des Charmilles S.A., Geneva, Switzerland

[21] Appl. No.: 318,689

[22] Filed: Nov. 6, 1981

[30] Foreign Application Priority Data

Jul. 15, 1980 [CH] Switzerland ............... 5406/80

[51] Int. Cl.³ .............................. B23P 1/08
[52] U.S. Cl. ............................. 219/69 W; 219/69 M
[58] Field of Search ........... 219/69 M, 69 W, 69 D, 219/69 E, 69 R; 226/97

[56] References Cited

U.S. PATENT DOCUMENTS 3,891,819  6/1975  Ullmann et al. ............. 219/69 W
4,069,961  1/1978  Nicklaus et al. .............. 226/97

FOREIGN PATENT DOCUMENTS 10130  2/1976  Japan ............................. 219/69 W
89442  7/1981  Japan ............................. 219/69 W

*Primary Examiner*—M. H. Paschall
*Attorney, Agent, or Firm*—Hauke and Patalidis

[57] ABSTRACT

A method and apparatus for threading the electrode wire of a trailing wire EDM apparatus through a starter hole or aperture in the workpiece or through the machined slot, the workpiece being submerged in a machining fluid. A chamber is disposed in contact with the workpiece under the workpiece, the chamber being in communication with an end of the aperture through the workpiece. The chamber is connected to a source of suction, with the result that fluid being sucked through the aperture in the workpiece converges towards the inlet of the aperture and guides the end of the electrode wire into the inlet of the aperture.

5 Claims, 4 Drawing Figures

METHOD AND APPARATUS FOR THREADING AN ELECTRODE WIRE THROUGH AN APERTURE IN A WORKPIECE

BACKGROUND OF THE INVENTION

In travelling wire EDM apparatus, it is known to thread the end of the electrode wire through an aperture or through the machined slot in the workpiece by means of a stream of fluid flowing through the aperture in the direction of threading of the electrode wire.

Such arrangements are described for example in Swiss Patent No. 559,599 and U.S. Pat. No. 3,987,270. Those patents disclose devices for forcibly passing the end of the electrode wire through a starter hole by a fluid stream, for example a stream of water, flowing under a very high pressure. Correct functioning of such devices present however many problems of construction and adjustment which are relatively difficult to solve. In effect, in order to achieve a pulling effect, it is necessary to evacuate from the machining zone any fluid there present. It is difficult to achieve sufficient accuracy in aim to drive the wire through a very narrow starter hole or aperture in the workpiece. In addition, after the wire has been introduced through the starter hole or aperture, it is difficult to engage the end of the wire into the conveying mechanism pulling the wire through the machining zone.

SUMMARY OF THE INVENTION

The main object of the present invention is to facilitate threading an electrode wire through a starter hole or aperture in the workpiece or through the machined slot, such starter hole, aperture or slot having a diameter for example of less than 1 mm, without first draining the machining fluid from the tank in which the workpiece is mounted. In addition, the invention permits to thread the wire through the aperture without requiring an accurately aimed jet of fluid.

The invention accomplishes its objects and advantages by providing a suction of the fluid from the outlet of the starter hole or aperture, such as to provide a stream of fluid converging into the inlet of the starter hole, and simultaneously presenting the end of the electrode wire proximate to the inlet of the starter hole or aperture.

These and other objects and advantages of the present invention will become apparent to those skilled in the art when the following description of the best mode contemplated for practicing the invention is read in conjunction with the accompanying drawing wherein:

DETAILED DESCRIPTION OF THE PREFERRED EMBODIMENTS

Figure 1:
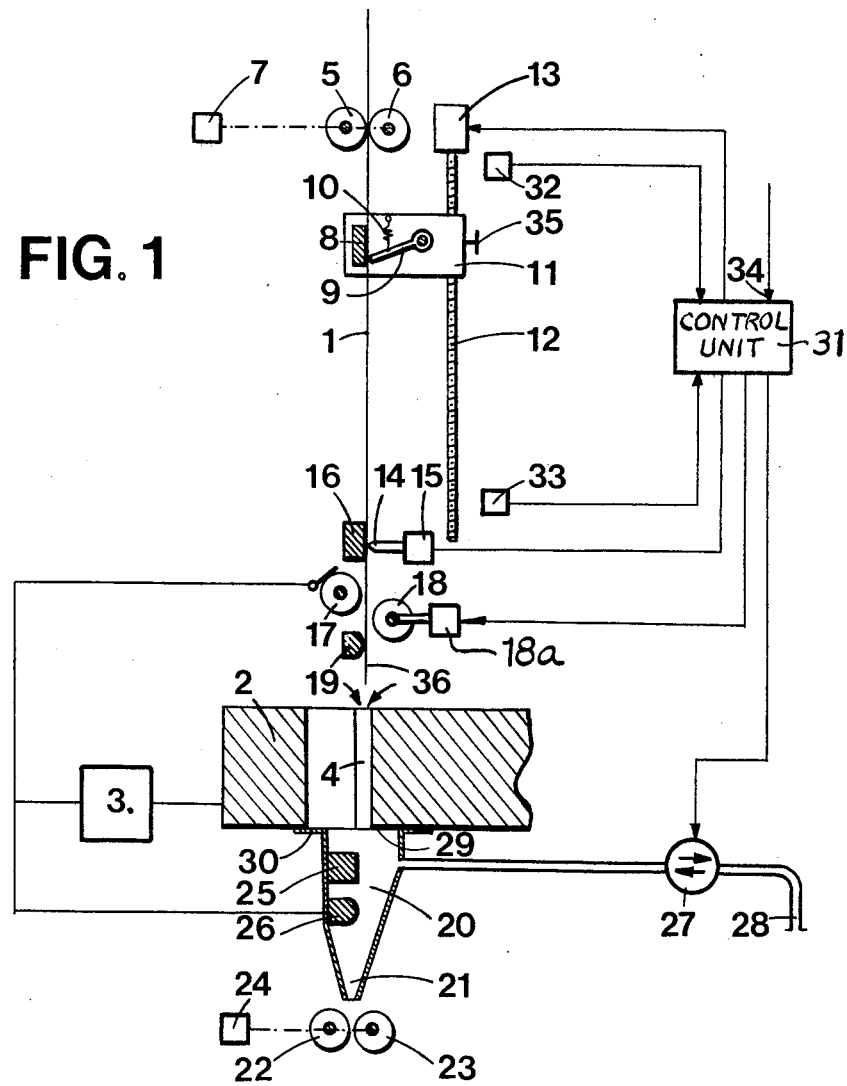
FIGS. 1 through 4 illustrate each an example of structure according to the present invention.

FIG. 1 illustrates schematically a portion of a travelling wire EDM apparatus for cutting a workpiece 2 by means of an electrode wire 1, the workpiece 2 being submerged in a tank, not shown, filled with a machining fluid, not shown. Electrical discharges occurring across the electrode wire 1 and the workpiece 2 are supplied by a pulse generator 3.

The workpiece 2 is provided with a starter hole or aperture 4 providing a passage for threading the electrode wire 1 therethrough at the beginning of a cutting operation, the starter hole or aperture consisting generally of the slot or kerf already cut in the workpiece in the event that the electrode wire ruptures during a cutting operation.

At FIG. 1, the electrode wire 1 is shown in its position just preceding the introduction of the wire end 36 into the aperture 4, the electrode wire 1 being obtained from a supply, such as a spool not shown, and being fed between two pinch rollers 5 and 6 controlled by an appropriate brake mechanism 7 such as to normally exert a pull on the wire. The wire 1 is subsequently passed between a bearing surface 8 and a finger 9 whose end is constantly biased toward the bearing surface 8 by a spring 10. The bearing surface 8, the finger 9 and the spring 10 are mounted on a wire threading carriage 11 linearly displaceable parallel to the wire trajectory by way of a lead screw 12 rotatably driven by an electric motor 13.

The wire 1 subsequently passes in front of a knife 14 operated by an actuator 15, such as a solenoid for example, the knife 14 being arranged to operate in co-operation with a bearing surface 16. From there the wire passes consecutively in front of an electrical current feeding roller 17, a pressure roller 18 reciprocable by an actuator 18a and a guide member 19, prior to being fed through the starter aperture 4. Below the workpiece 2, the wire 1 is introduced into a chamber 20 whose lower portion comprises converging walls 21 forming a funnel having an outlet disposed proximate a pair of pinch rollers 22 and 23 driven by an electric motor 24 for exerting a traction on the wire and providing longitudinal feed of the wire during electrical discharge machining. It will be appreciated that the amount of traction exerted on the wire 1 is dependent upon the adjustment of the brake mechanism 5–7, the wire being subsequently evacuated by means not shown.

The chamber 20 contains a guide member 25 and a sliding contact 26 against which the wire 1 is applied by the pull exerted by the pinch rollers 22 and 23. The chamber 20 is placed in communication with a reversible pump 27 having an outlet 28 which discharges simply into the machining fluid tank. The chamber 20 has an upper opening 29 provided with a flanged joint 30 adapted to be applied against the lower surface of the workpiece 2.

The arrangement of FIG. 1 also comprises a control unit 31 which includes appropriate electronic circuits providing the required command signals for effecting threading of the wire through the starter aperture 4 in the workpiece 2. The control unit 31 controls the operation of the motor 13, of the knife actuator 15 and of the pressure roller actuator 18a. The control unit 31 also co-operates with two detectors 32 and 33 providing an indication of the limit positions of travel of the carriage 11. Operation of the control unit 31 is triggered by an electrical signal applied to an input 34. The triggering signal may be manually applied at the beginning of a machining operation or, alternatively and in addition, it may be applied by an appropriate monitoring device capable of detecting rupture of the wire.

When rupture of the wire occurs during a machining operation, the wire breaks between the brake mechanism rollers 5–6 and the feed pinch rollers 22–23, generally in the machining zone defined between the wire 1 and the workpiece 2, namely at the point where the wire is heated by the electrical current flowing through the wire and by the electrical discharges occurring between the wire and the workpiece 2. The net result is that prior to rethreading the wire through the slot in the workpiece, the free end 36 of the wire is generally proximate to the workpiece 2, about as illustrated at FIG. 1.

Threading of the wire 1 through the workpiece 2 is effected as follows:

In its dwell or wait position, the carriage 11, which is provided with an index member 35, is in its upper position with its index member 35 aligned with the detector 32. When the command signal applied to the input 34 of the control unit 31 triggers the operation of the control unit, the control unit 31 applies a command pulse to the knife actuator 15 to drive the knife 14 against the bearing surface 16 such as to neatly cut off the wire end while, simultaneously, a signal is applied to the actuator 18a of the pressure roller 18 to retract the pressure roller from the wire path. Subsequently thereto, the electric motor 13 is started to drive the carriage 11 downwardly, while the pump 27 is started to suck from the chamber 20 the machining fluid contained in the chamber. The suction exerted on the interior of the chamber 20 causes the machining fluid in which the workpiece 2 is immersed to flow rapidly through the aperture 4 in the workpiece and through the lower outlet of the chamber 20. Since the workpiece 2 is inmersed in a liquid machining fluid, suction of the fluid through the aperture 4 causes a stream of liquid fluid to converge towards the inlet of the aperture 4.

In the position illustrated at FIG. 1, the carriage 11 has already travelled a portion of its stroke, sufficiently to bring the free end 36 of the wire 1 proximate the inlet of the aperture 4. In view of the convergence of the stream of fluid sucked through the aperture 4, the end 36 of the wire 1 is automatically guided by the hydraulic forces resulting from the converging stream and is aligned with the aperture 4, even though initially the alignment of the wire end was upset a distance which could exceed 1 mm.

The carriage 11 continuing its descent causes the wire 1 to be pinched between the end of the finger 9 and the bearing surface 8, thus pushing the free end 36 of the wire through the aperture 4 into the chamber 20. The reversible pump 27 may then be stopped and restarted in the direction that supplies fluid under pressure to the chamber 20 to cause a flow of machining fluid through the machining zone. As soon as the carriage 11 reaches its lower position, as detected by the detector 33, the length of travel of the carriage has been sufficient to cause the free end 36 of the wire to be passed between the pinch rollers 22 and 23. The signal supplied by the detector 33 to the control unit 31 controls the return of the carriage 11 to its upper or dwell position.

It will be appreciated that the command signal applied to the input 34 of the control unit 31 can be obtained in various ways. One arrangement for triggering the operation of the control unit 31 can be effected by way of the pressure roller 18 because, at the instant the wire is ruptured, the wire is no longer under tension and therefore it no longer presents any resistance to the pressure applied by the pressure roller 18. External displacement of the pressure roller 18 can therefore be used to close a switch providing a signal applied to the input 34 of the control circuit 31 for triggering the operation of the control unit.

Figure 2:
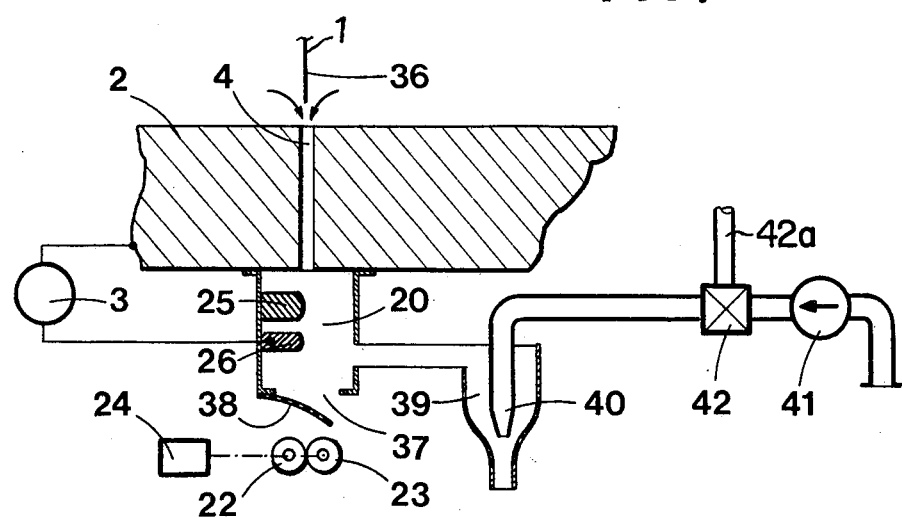

In the example of structure according to FIG. 2 are shown only the parts which are modifications of the parts illustrated at FIG. 1. The chamber 20 is provided with a lower opening 37 capable of being closed by a flap valve 38 made of a flexible membrane. Drop of the pressure in the chamber 20 is obtained by means of a suction jet pump 39 comprising a nozzle 40 supplied in fluid by a pump 41, which may be the same pump as the one supplying machining fluid under pressure to the machining zone by means not shown. A three-way valve 42 enables to supply fluid under pressure either to the nozzle 40 of the jet pump 39 or to a line 42a supplying fluid to the machining zone.

When the jet pump 39 is in operation, the suction applied to the chamber 20 first causes the flap valve 38 to close the opening 37 and then to exert a suction through the aperture 4. The end 36 of the electrode wire 1 is thus pulled through the aperture 4 in the same manner as in the arrangement of FIG. 1.

Figure 3:
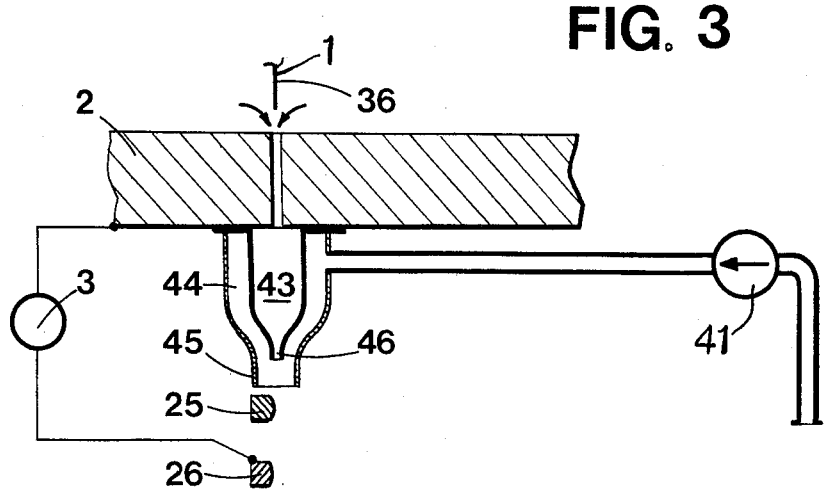

The structure illustrated at FIG. 3 is very similar to the structure of FIG. 2, and the principal difference is that the jet pump itself forms the suction chamber 43, the suction chamber 43 being surrounded by an annular chamber 44 having a nozzle 45 generally surrounding the outlet orifice 46 of the suction chamber 43. The annular chamber 44 is supplied with machining fluid under pressure by the pump 41, and the flow of fluid under pressure through the nozzle 45 causes a suction to be applied to the interior of the chamber 32. In the arrangement of FIG. 3, the end 36 of the electrode wire 1 is pulled into the chamber 43 and comes out through the outlet orifice 46 without the necessity of stopping the pump 41.

Figure 4:
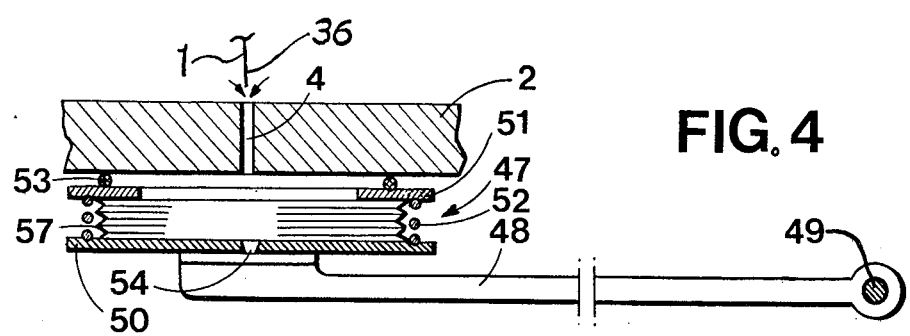

FIG. 4 illustrates a very simple structure for practicing the present invention. In the structure illustrated, suction of the machining fluid through the aperture 4 in the workpiece 2 is achieved by means of a bellows 47 actuated by an arm 48 fastened at one of its ends to a pivot shaft 49. The bellows 47 comprises a disk 50 and a washer 51 interconnected by a corrugated flexible cylinder 57 hermetically secured to the disk 50 and to the washer 51. A coiled spring 52 is interposed between the disk 50 and the washer 51 such as to urge them away from each other. The washer 51 is provided with an annular gasket, or 0-ring, 53 engaging the lower face of the workpiece, and the disk 50 has a centrally disposed orifice 54 permitting the wire to pass through the disk and to reach the wire conveyor mechanism, not shown.

When it is desired to pull the end 36 of the wire 1 through the preformed starter hole or aperture 4, or machined slot, the arm 48 is operated by a drive mechanism such as a cam, not shown, for placing the bellows 47 against the lower face of the workpiece 2, while compressing the spring 52. Any liquid fluid contained within the bellows is first ejected through the aperture 4 in the workpiece, the orifice 54 in the disk 50 and around the periphery of the washer 51 because the gasket 53 forms a flexible lip in engagement with the lower surface of the workpiece 2. Following this motion, and simultaneously with the end 36 of the wire 1 being brought proximate the inlet of the aperture 4, the bellows arm 48 is released such that the spring 52 causes the bellows to extend thus causing a suction of the machining fluid through the aperture 4. Because of the drop of pressure in the bellows 47, the gasket 53 is automatically firmly applied against the lower face of the workpiece 2. As the speed at which the wire is fed by the carriage 11 of FIG. 1 is known, the moment at which the end 36 of the wire reaches the orifice 54 is also known. The timing of the motion of the arm 48 is such that, at that moment, the arm 48 is displaced in the direction depressing the bellows 47, which results in pushing part of the machining fluid within the bellows through the orifice 54, with the result that the fluid flow converges towards the inlet of the orifice 54. In this manner, the end of the wire is hydraulically guided such as to be pushed through the orifice 54 without difficulty.

The invention is subject to many modifications of structure without departing from the principle of the invention. For example, in the arrangement of FIG. 4 means could be provided for moving away the bellows 47, for example by linear displacement along the lower face of the workpiece 2, as soon as the end 36 of the electrode wire 1 has been passed through the aperture 4. In this manner, free access is gained to the lower wire guide means and to the wire conveyor means.

Having thus described the present invention by way of examples of structure particularly well designed for practicing the invention, modifications whereof will be apparent to those skilled in the art, what is claimed as new is as follows:

1. A method for threading an end of an electrode wire through a starter aperture in a workpiece mounted on an EDM apparatus, said workpiece being immersed in machining fluid, wherein said machining fluid is normally caused to flow through said aperture in the workpiece from an inlet to an outlet in the same direction as the direction of passage of said wire through said aperture in the workpiece, said method comprising disposing a chamber in jointed engagement with said workpiece, said chamber having an opening surrounding the outlet of said aperture in the workpiece, connecting a source of suction to said chamber for causing said fluid to flow through said aperture in the workpiece by exerting suction at said outlet of said aperture such as to create a flow of fluid converging towards the inlet of said aperture, simultaneously bringing the end of said electrode wire proximate said inlet of said aperture in the workpiece, whereby the end of said electrode wire is substantially centered relative to said inlet of said aperture in the workpiece by a converging flow of said fluid toward said inlet of said aperture in the workpiece, and feeding said electrode wire through said aperture in the workpiece.

2. In an apparatus for threading the electrode wire of a travelling wire EDM apparatus through an aperture in a workpiece comprising means for drawing the electrode wire downstream of a machining zone formed between said electrode wire and said workpiece, said workpiece being immersed in a fluid, said aperture having an inlet and an outlet, the improvement comprising a chamber having an end disposed in jointed engagement with said workpiece, an opening in said end of said chamber, said opening surrounding the outlet of said aperture in said workpiece for placing said outlet in communication with said chamber, suction means for causing a drop of pressure in said fluid contained in said chamber and in said aperture by drawing a quantity of said fluid through said aperture into said chamber, and wire electrode feeding means for bringing the end of said electrode wire proximate the inlet of said aperture whereby said electrode wire end is substantially centered relative to the inlet of said aperture in the workpiece by a converging flow of said fluid toward said inlet and is fed through said aperture by the combined action of said wire electrode feeding means and of fluid drawn through said aperture into said chamber.

3. In an apparatus for threading the electrode wire of a travelling wire EDM apparatus through an aperture in a workpiece comprising means for drawing the electrode wire downstream of a machining zone formed between said electrode wire and said workpiece, said aperture having an inlet and an outlet, the improvement comprising a chamber having an end disposed in jointed engagement with said workpiece, an opening in said end of said chamber, said opening surrounding the outlet of said aperture in said workpiece for placing said outlet in communication with said chamber, suction means for causing a drop of pressure in a fluid contained in said chamber and in said aperture by drawing a quantity of said fluid through said aperture into said chamber and means for bringing the end of said wire proximate the inlet of said aperture whereby said wire end is drawn through said aperture into said chamber by said flow of fluid into said chamber, wherein said chamber has an outlet orifice opposite said opening, said orifice being provided with a valve closed by said drop of pressure in said chamber, and further comprising means increasing said pressure in said chamber for opening said valve for opening said orifice in the absence of low pressure in said chamber for providing a passage for said wire through said orifice.

4. The improvement of claim 2 wherein said chamber has an outlet orifice opposite said opening, at least one guide wall in said chamber converging towards said outlet orifice from said chamber, said outlet orifice being disposed aligned with said wire drawing means.

5. The improvement of claim 4 wherein said chamber is surrounded by an annular chamber having an outlet nozzle surrounding in turn the outlet orifice of said first-mentioned chamber, and further comprising means for supplying said annular chamber with pressurized fluid whereby fluid flowing through said nozzle exerts a suction in said first-mentioned chamber and causes flow of said fluid into said first-mentioned chamber.

* * * * *

UNITED STATES PATENT AND TRADEMARK OFFICE
CERTIFICATE OF CORRECTION

PATENT NO. : 4,465,915

DATED : August 14, 1984

INVENTOR(S) : Francois Corcelle

It is certified that error appears in the above-identified patent and that said Letters Patent are hereby corrected as shown below:

Column 3, line 25-26    "inmersed" should read --immersed--

Signed and Sealed this

*Fifth* Day of *February 1985*

[SEAL]

*Attest:*

DONALD J. QUIGG

*Attesting Officer*    *Acting Commissioner of Patents and Trademarks*